W. J. McKEE.
MACHINE FOR PASTEURIZING LIQUIDS.
APPLICATION FILED MAR. 16, 1908. RENEWED MAR. 13, 1909.

945,404.

Patented Jan. 4, 1910.
2 SHEETS—SHEET 1.

Witnesses

Inventor
W. J. McKee
By
Attorneys

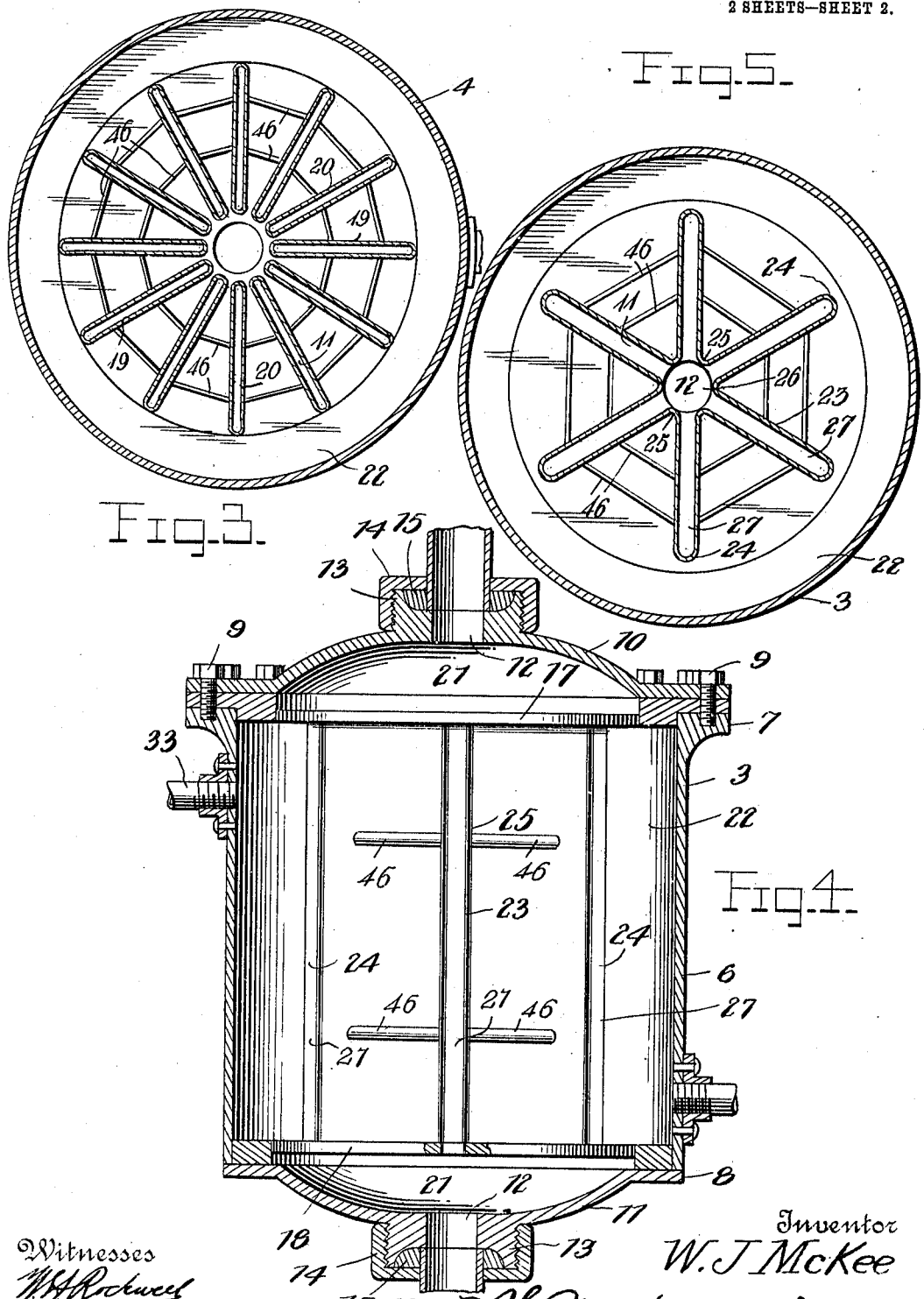

UNITED STATES PATENT OFFICE.

WILLIAM J. McKEE, OF DETROIT, MICHIGAN.

MACHINE FOR PASTEURIZING LIQUIDS.

945,404.  Specification of Letters Patent.  Patented Jan. 4, 1910.

Application filed March 16, 1908, Serial No. 421,459. Renewed March 13, 1909. Serial No. 483,299.

*To all whom it may concern:*

Be it known that I, WILLIAM J. MCKEE, a citizen of the United States, residing at Detroit, in the county of Wayne and State of Michigan, have invented certain new and useful Improvements in Machines for Pasteurizing Liquids; and I do declare the following to be a full, clear, and exact description of the invention, such as will enable others skilled in the art to which it appertains to make and use the same.

This invention relates to pasteurizing machines and has for its object to provide in a device of this kind means whereby the liquid may be raised to a very high temperature and then reduced to a very low temperature.

Another object is to provide in a device of this kind means whereby the liquid which has been heated is caused to heat the liquid which has not yet been heated, thus at the same time raising the temperature of the liquid which is to be further heated and lowering the temperature of the liquid which is to be further cooled. In this way marked economy of the pasteurizing operation is effected.

Another object is to provide in a device of this kind efficient means whereby the liquid to be heated or cooled may be given a very large contacting surface to receive the heat or cold to be applied thereto.

Another object is to provide a device of this kind which may be easily and conveniently constructed and which will be efficient and durable in operation.

For these and other objects which will presently appear, this invention consists of certain novel combinations and arrangements of parts of which the herein described machine for pasteurizing liquids is one of many possible embodiments.

Figure 1:
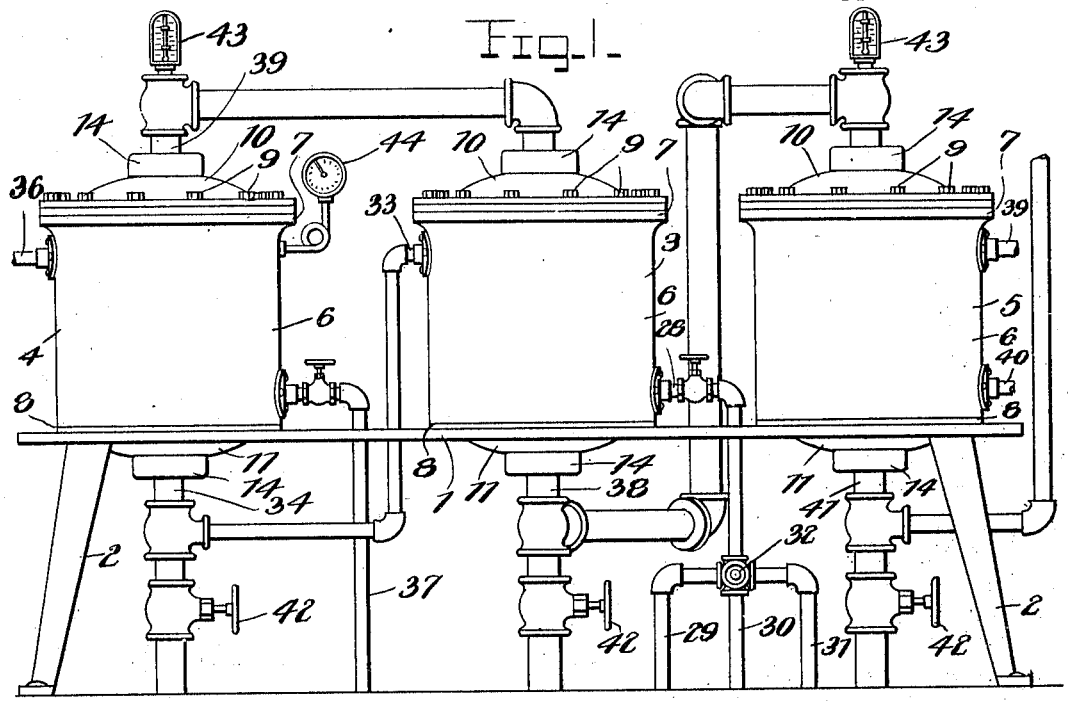
Figure 2:
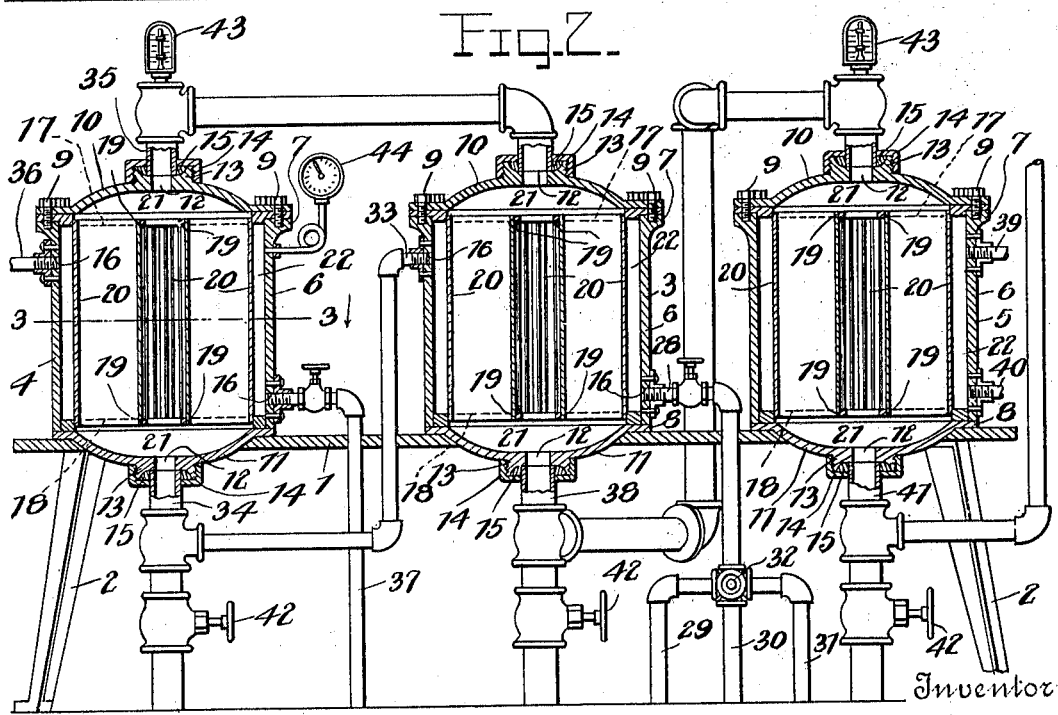

In the annexed drawings forming a part of this specification which are for illustrative purposes only and therefore are not drawn to any particular scale and in which like reference characters refer to like parts throughout the several views, Figure 1 is a side elevation of my machine, parts being shown in section; Fig. 2 is a longitudinal vertical sectional view parts being shown in elevation; Fig. 3 is a sectional view taken on the line 3—3 of Fig. 2; Fig. 4 is a longitudinal sectional view of a section of the machine showing a modification thereof, and, Fig. 5 is an end view showing the construction of the parts shown in Fig. 4.

Referring more particularly to the drawings, my device is shown mounted upon a table 1 or other suitable support having legs 2 by which the same may be placed in a convenient position. On the table 1 are placed three cylindrical sections 3, 4 and 5. These sections are almost identical and the interior construction thereof will be described before the sections are referred to.

Each cylinder consists of a cylindrical casing 6 having upper and lower projecting flanges 7 and 8 to which are fastened by means of studs or the like 9 the upper and lower covers 10 and 11. Centrally disposed of each of said covers is the opening 12 provided with a screw threaded boss 13 and centrally upon it is provided the gland 14 between which and said boss is held the packing 15 adapted to press against a pipe inserted therein. Said cylindrical casing is provided at convenient positions near its upper and lower edges with outlet openings 16. Between said flanges 7 and the covers 10 and 11 and extending across the upper and lower ends of said cylindrical casing are radially slotted circular diaphragms 17 and 18. Said diaphragms are provided with the radially projecting slots 19, the slots of the upper diaphragm being positioned exactly above corresponding slots of the lower diaphragm. In said slots and connecting each upper slot to its corresponding lower slot are flattened vertical tubes 20 forming tight joints with said diaphragms whereby the space 21 between said diaphragms and said cover and the space within said tubes forms a continuous receptacle separated from the space 22 between the outer edges of said tube and said cylindrical casing.

If desired, instead of longitudinal tubes 20 may be substituted a tube 23 which consists of a sheet of metal bent in the manner shown in Fig. 5 which piece of metal may be then formed into a tube of star shaped cross section by bending the ends 24 and 25 as will be apparent. This forms a tube having a central body part 26 and radial parts 27. Of course, it is understood that the slots 19 would have to be lead to a central opening adapted to receive the body part 26.

The sections 3, 4 and 5 are placed upon the table 1 as shown, the section 3 being formed near the lower part thereof with an inlet pipe 28 communicating with one or more vats or a water supply not shown by means of the pipes 29, 30 and 31. The liquid to be cooled enters one of said last mentioned pipes and passes through a controlling valve 32 up through the pipe 28 into the space 22 on the outside of the tubes, passes out through the upper outlet pipe 33, then passes downwardly and upwardly through the lower end of the pipe 34 into the space 21 of the section 4, and thence out through the top outlet pipe 35.

The section 4 has steam circulating in the space 22 thereof by means of a steam inlet pipe 36 and a steam outlet pipe 37. It will thus be seen that the liquid which has been introduced through the pipe 34 is divided to spread over the inner surfaces of the pipes 20 whereby said liquid is heated by means of the heat conducted through the walls of said pipes from the steam on the outside. After the liquid is thus heated, it passes outwardly through the top outlet pipe into the space 21 of the section 3. As the liquid is now highly heated in passing through the pipes 21 it must give up a great portion of its heat to the newly introduced cold liquid in the space 22 of said section 3. In this manner the liquid in the space 21 of the section 3 not only serves to heat the newly introduced liquid but the newly introduced liquid also serves to cool the liquid which has already passed through the heating section 4.

The partially cooled liquid in the section 21 passes outwardly through the lower outlet pipe 38 up and enters the space 21 of the section 5. The section 5 is provided with inlet and outlet brine pipes 39 and 40 by means of which brine is circulated around the tubes 20 in the space 22 whereby the liquid is cooled. After the liquid has passed through the tubes 20 of the section 5 it passes out through the final outlet pipe 41 from which point it may be led to a storage vessel, to a carbonator, or to any place desired.

The outlet pipes 34, 38 and 41 may be provided with drain cocks 42 for an obvious purpose. The device may be provided with thermometers 43 and a steam gage 44. Stays or braces 46 are arranged between the water tubes to hold the sides of the tubes against spreading.

Any one of the pipes 29, 30 or 31 may be connected to a water supply in order that water may be run through the pasteurizing machine to clean the same. The other of said pipes may be connected to storage vats not shown from which the liquid to be cooled is drawn. If desired, a pump may be placed in series with the pipe 28 whereby liquid may be passed to the device. These parts are not illustrated as they form no part of the present invention. I reserve the right to use my device in connection with any desired similar storage or pumping means.

The operation of this device will be understood without further explanation.

The walls of the tubes are flat, quite near and parallel to each other, the amount of surface of liquid exposed in proportion to the volume in the tubes is very large so that the heating and cooling take place very rapidly. The material for the tubes may be quite thin, in which case the tubes would be liable to bulge out were it not for the braces 46 between the tubes. The number, location and position of these braces will depend upon the size and thickness of the material of the tubes and on the pressure within them.

While this device is particularly adapted for the pasteurizing of beer and milk, it is understood that I do not limit myself to the pasteurizing of any liquid or to pasteurizing at all but claim the broad idea of heating or cooling a liquid by heating or cooling the liquid which is just entering the device by that which has already been heated or cooled within the device.

Having thus described my invention, what I claim as new and desire to secure by U. S. Letters-Patent is:

1. A device of the class described comprising approximately corresponding warming, heating and cooling sections each comprising an outer cylindrical casing provided at opposite ends with outwardly projecting rims, convex covers provided with straight rims screwed over opposite ends of said casing, diaphragms each provided with a series of radially projecting slots arranged in opposite ends of the cylinders with their edges clamped between the covers and cylindrical rims, and a series of longitudinal flattened tubes arranged in said casing with their ends projecting into the slots of the diaphragms.

2. A pasteurizing device comprising approximately corresponding warming, heating and cooling sections, each comprising an outer casing provided at opposite ends with heads, diaphragms, each provided with a series of radial slots arranged in opposite ends of the casings with their edges clamped between the heads and the casing, and a series of flattened tubes arranged in the casing between the diaphragms with their ends projecting into the slots in the diaphragms and circulating pipes whereby the flattened tubes and the spaces surrounding them are each connected to the tubes of another section respectively, and a heating and a cooling medium are conducted to the spaces around said tubes of one of the other sections respectively.

3. A pasteurizing device comprising approximately corresponding warming, heating and cooling sections, each comprising an outer casing provided at opposite ends with heads, diaphragms, each provided with a series of radial slots, arranged in opposite ends of the casings with their edges clamped between the heads and the casing, a series of flattened tubes arranged in the casing between the diaphragms with their ends projecting into the slots in the diaphragms and braces between the tubes and circulating pipes whereby the flattened tubes and the spaces surrounding them are each connected to the tubes of another section respectively, and a heating and a cooling medium are conducted to the spaces around said tubes of one of the other sections respectively.

4. In a pasteurizing device, the combination of warming, heating and cooling sections, each comprising an outer casing provided at opposite ends with heads, diaphragms, each provided with a series of slots, arranged in opposite ends of the casings with their edges clamped between the heads and the casing, a series of flattened tubes arranged in the casing between the diaphragms with their ends secured to the diaphragms at the slots, pipes through which the liquid to be pasteurized will pass through all three sections, and pipes by means of which a cooling element may pass through one of the sections and a heating element may pass through another of the sections.

In testimony whereof I have hereunto set my hand in presence of two subscribing witnesses.

WILLIAM J. McKEE.

Witnesses:
ALVAH G. PITTS,
IDA LAPPENS.